United States Patent
Öberg et al.

(10) Patent No.: US 12,386,527 B2
(45) Date of Patent: Aug. 12, 2025

(54) SYSTEM AND METHOD FOR REPURPOSING OR DISPOSING OF AN IT ASSET

(71) Applicant: Blancco Technology Group IP Oy, Joensuu (FI)

(72) Inventors: Daniel Öberg, Joensuu (FI); Tom Reid, Joensuu (FI); Väinö Leppänen, Joensuu (FI); Irina Pirogova, Joensuu (FI)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 790 days.

(21) Appl. No.: 16/461,675

(22) PCT Filed: Nov. 17, 2017

(86) PCT No.: PCT/EP2017/079693
§ 371 (c)(1),
(2) Date: May 16, 2019

(87) PCT Pub. No.: WO2018/091695
PCT Pub. Date: May 24, 2018

(65) Prior Publication Data
US 2019/0354298 A1    Nov. 21, 2019

(30) Foreign Application Priority Data
Nov. 18, 2016   (GB) .................................... 1619580

(51) Int. Cl.
*G06F 12/00* (2006.01)
*G06F 3/06* (2006.01)
*G06Q 30/0201* (2023.01)

(52) U.S. Cl.
CPC .......... *G06F 3/0623* (2013.01); *G06F 3/0652* (2013.01); *G06F 3/0673* (2013.01); *G06Q 30/0206* (2013.01)

(58) Field of Classification Search
CPC .... G06F 3/0623; G06F 3/0652; G06F 3/0673; G06F 12/02; G06Q 30/0206
See application file for complete search history.

(56) References Cited

U.S. PATENT DOCUMENTS 7,475,203 B1 *   1/2009   Petrillo, Jr. ........... G06F 3/0676
                                                      711/159
9,747,057 B1 *   8/2017   Ramani .................... G06F 3/067
(Continued)

OTHER PUBLICATIONS

International Search Report and Written Opinion dated Feb. 6, 2019 in PCT/EP2017/079693.

*Primary Examiner* — Shawn X Gu
(74) *Attorney, Agent, or Firm* — DICKINSON WRIGHT PLLC

(57) ABSTRACT

A method for use in repurposing, erasing data from, and/or disposing of an IT asset comprises transmitting a signal, for example an erasure target signal, from the IT asset to a server located remotely from the IT asset, receiving at the server at least part of a profile of the IT asset, and in response to receipt of the signal, for example the erasure target signal, at the server, identifying an action to be performed in relation to the IT asset based at least in part on the profile or part of the profile of the IT asset. The method may comprise transmitting instructions from the server to an erasure client, which instructions at least partially define the action to be performed in relation to the IT asset and in response to receipt of the instructions at the erasure client, performing the action in relation to the IT asset. The action to be performed may comprise an erasure procedure.

17 Claims, 5 Drawing Sheets

(56) References Cited

U.S. PATENT DOCUMENTS

| | | |
|---|---|---|
| 2006/0021006 A1 | 1/2006 | Rensin |
| 2009/0253410 A1* | 10/2009 | Fitzgerald ............. H04W 12/30 |
| | | 455/414.1 |
| 2014/0282857 A1* | 9/2014 | White ....................... G01S 5/02 |
| | | 726/1 |
| 2015/0089659 A1* | 3/2015 | Beckman ............ G06F 21/6227 |
| | | 726/26 |
| 2015/0169462 A1* | 6/2015 | Vaisanen ............... H04L 9/0662 |
| | | 711/166 |
| 2015/0261522 A1* | 9/2015 | Aderton .................... G06F 8/65 |
| | | 717/170 |
| 2016/0004648 A1 | 1/2016 | Mukouchi |
| 2016/0188249 A1 | 6/2016 | Kang |
| 2016/0253529 A1 | 9/2016 | Griffes |

\* cited by examiner

SYSTEM AND METHOD FOR REPURPOSING OR DISPOSING OF AN IT ASSET

CROSS-REFERENCE TO RELATED APPLICATIONS

This application is U.S. national phase filing under 35 U.S.C. § 371 of PCT/EP2017/079693 (the "693 application") filed on Nov. 17, 2017 and titled, "System and Method for Repurposing or Disposing of an IT Asset." The '693 application claims priority from the Great Britain Application No. 1619580.2 filed Nov. 18, 2016 and titled, "System and Method for Repurposing or Disposing of an IT Asset." Both of the aforementioned applications are incorporated herein by reference in their entirety for all purposes.

FIELD

This application relates to a system and method for use in repurposing an IT asset, erasing data from an IT asset and/or disposing of an IT asset.

BACKGROUND

It may be desirable to prevent access to sensitive data stored on an IT asset when the IT asset is to be repurposed, reallocated to a new user, or retired, for example by removing the sensitive data from the IT asset or destroying the IT asset. The continued drive towards enhanced privacy and data protection legislation and the introduction of associated environmental regulations serves to emphasise the importance of the effective erasure of data from IT assets and the importance of verification of data erasure to demonstrate compliance with data erasure requirements defined by legislation, regulation and/or standards.

Known techniques used for removing sensitive data from the memory of an IT asset include predefined data erasure procedures which write a predetermined data pattern to fill the entire memory of the IT asset and replace sensitive data with redundant or null data. The predetermined data pattern is usually determined according to the requirements of the erasure standard being followed. A separate data eraser apparatus may perform the data erasure procedure. Alternatively, the IT asset may include firmware or software which defines the data erasure procedure and a separate data eraser apparatus may initiate the data erasure procedure. The particular data erasure procedure used is defined according to the type of IT asset. For example, a cryptographic erasure procedure is known for use with Self-encrypting Drives (SEDs) in which the key used to encrypt the stored data is changed, thus rendering the stored data meaningless. This may result in different apparently random data being stored in the memory of the IT asset before and after cryptographic erasure. An over-write erasure procedure is known for use with Hard Disk Drives (HDDs) in which stored data is replaced with a pre-determined data pattern. For example, it is known to over-write the memory of a HDD with all binary zeroes. A block erase procedure is also known for use with Solid State Drives (SSDs) in which a block erasure is performed (tunnel release) on NAND flash memory. The particular erasure procedure used may also vary according to the type of interface used between the data eraser apparatus and the IT asset.

Data erasure systems and methods are known which are activated from a remote server or other site when a computer is reported lost or stolen. However, such known data erasure systems and methods may not be sufficiently flexible or efficient to successfully erase data from some IT assets to a required standard or specification in a commercially viable manner, especially when erasing large numbers of IT assets of different types.

SUMMARY

It should be understood that any one or more of the features of any of the following aspects or embodiments may be combined with any one or more of the features of any of the other aspects or embodiments. For example, method features may be applied as apparatus features and vice versa.

According to an aspect or an embodiment there is provided a method for use in repurposing, erasing data from, and/or disposing of an IT asset, the method comprising:
 transmitting a signal, for example an erasure target signal, from the IT asset to a server located remotely from the IT asset;
 receiving at the server at least part of a profile of the IT asset; and
 in response to receipt of the signal, for example the erasure target signal, at the server, identifying an action to be performed in relation to the IT asset based at least in part on the profile or part of the profile of the IT asset.

The method may comprise:
 transmitting instructions from the server to an erasure client, which instructions at least partially define the action to be performed in relation to the IT asset; and
 in response to receipt of the instructions at the erasure client, performing the action in relation to the IT asset.

The erasure client may be provided with the IT asset.

The erasure client may be provided separately from the IT asset. The erasure client may comprise a data eraser apparatus for erasing data from the IT asset, which data eraser apparatus is separate from, and/or independent of, the IT asset.

The erasure client may comprise an erasure application.

The erasure application may be provided with the IT asset. The erasure application may be stored in a memory of the IT asset. The erasure application may be configured to run on a dedicated operating system of the IT asset but which is independent of an operating system of the IT asset.

The erasure client may comprise an erasure agent. The erasure agent may be provided with the IT asset. The erasure agent may be stored in a memory of the IT asset. The erasure agent may be configured to run on an operating system of the IT asset. The erasure agent may be configured to work in combination with the erasure application.

The erasure application may be provided separately from, and/or independently of, the IT asset. The erasure application may be provided with the data eraser apparatus. The erasure application may be stored in a memory of the data eraser apparatus.

The erasure target signal may comprise information identifying the IT asset as a target for performance of an erasure procedure. The erasure target signal may comprise an indication that the IT asset is online, that the IT asset is ready, or is seeking, to communicate, or that the IT asset is ready to receive information or instructions.

The profile may comprise a hardware profile. The hardware profile may comprise, for example, data representative of at least one of type of storage device, operating system or type of operating system, file system or type of file system, size of storage, security of storage, presence or absence of encryption, whether or not the storage comprises at least one of secure or encrypting storage.

Alternatively or additionally, the profile may comprise data indicating geographical location of the IT asset. The action to be performed in relation to the IT asset may depend on the geographical location of the IT asset, for example because different geographical locations are subject to different legislation, regulations and/or standards.

Alternatively or additionally, the profile may comprise data indicating an identity of at least one of an owner, operator and user of the IT asset and/or data indicating one or more preferences in respect of data erasure specified by at least one of an owner, operator and user of the IT asset. The action to be performed in relation to the IT asset may depend on at least one of an owner, operator and user of the IT asset, for example because different owners, operators and users of the IT asset may have different internal data erasure requirements or standards or because different owners, operators or users of the IT asset may be required to perform data erasure according to different customer data erasure requirements or different customer standards.

Different actions may be appropriate in relation to the IT asset according to the profile or at least part of the profile. For example, identifying at the server an action to be performed may comprise identifying at the server an erasure procedure for the erasure of data from the memory of the IT asset and/or at least one feature of such an erasure procedure. It should be understood that different erasure procedures may be appropriate for different types of IT assets. For example, some IT assets may define erasure functionality internally in firmware. For such an IT asset, the method may comprise using at least part of the erasure functionality defined by the IT asset.

The method may comprise identifying at least one of a type of erasure procedure to be performed, an overwriting pattern to be used, a payload to be used, a type of overwriting pattern to be used, a type of payload to be used, a verification procedure to be used, a type of verification procedure to be used, an erasure standard to be used, and a requirement for acceptance of the erasure procedure as successful.

The identifying of the erasure procedure or said at least one feature of the erasure procedure may comprise selecting the erasure procedure or said at least one feature of the erasure procedure from a plurality of stored erasure procedures or stored features of erasure procedures, for example selecting erasure procedure configuration information from a stored set of configuration data.

Identifying at the server an action to be performed in relation to the IT asset may comprise identifying at the server that the IT asset should be partially or wholly destroyed. It may not be technically or commercially viable to perform an erasure procedure for every IT asset and it may be necessary or it may be more cost-effective to partially or wholly destroy an IT asset rather than performing a data erasure procedure.

The method may comprise accessing information relating to the market value or price of the asset and identifying at the server the action to be performed based at least in part upon the accessed information.

Identifying at the server the action to be performed may comprise identifying at the server that the IT asset should be held in quarantine for a predefined quarantine period before performing an erasure procedure for the erasure of data from the memory of the IT asset or before partially or wholly destroying the IT asset.

The method may comprise receiving at the server an erasure specification.

The method may comprise identifying the action to be performed in relation to the IT asset based at least in part on the erasure specification.

The erasure specification may define the erasure procedure or at least one feature of the erasure procedure.

The erasure specification may comprise a specification for the erasure procedure and/or for the verification of data erasure.

The erasure specification may comprise a specification for over-writing of data across a predetermined proportion of an addressable area of the memory of the IT asset, or verification thereof. The erasure specification may indicate that a firmware erasure process defined by the IT asset should be used. Examples of a firmware erasure process are crypt erase, block erase, secure erase (ATA only), Format Unit (SCSI and NVME device) or a combination of any of these.

The erasure specification may be defined by a user, operator or owner of the IT asset. The erasure specification may be defined for compliance with requirements of a customer of a user, operator or owner of the IT asset.

The erasure specification may be defined for compliance with regulations, legislation and/or one or more standards for one or more countries or territories. The erasure specification may be defined according to the geographical location of the IT asset.

The method may comprise assessing the technical or commercial feasibility of performing the erasure procedure. For example, the method may comprise assessing the technical or commercial feasibility of performing the erasure procedure against the erasure specification.

Performing the identified action in relation to the IT asset may comprise assessing the technical or commercial feasibility of performing the erasure procedure against the erasure specification.

The method may comprise assessing at the server the technical or commercial feasibility of performing the erasure procedure against the erasure specification.

The method may comprise assessing at the erasure client the technical or commercial feasibility of performing the erasure procedure against the erasure specification.

The method may comprise communicating the technical or commercial feasibility of performing the erasure procedure against the erasure specification from the erasure client to the server.

The method may comprise validating the erasure specification. This could be part of, or be achieved using, two-way communications, for example two-way communications between the server and the erasure client.

The method may comprise validating if the erasure procedure is feasible. For example, it may not be possible to NIST Purge a solid state drive (SSD) that does not support the Sanitize feature set or if freeze locks prevent an erasure. Helping a user to validate the feasibility could help throughput by rooting out invalid job requests. Additionally or alternatively, the method may comprise validating the xml, settings and values. The validity of the xml, settings and values may be provided for settings.

The IT asset may comprise a data storage apparatus. The data storage apparatus may comprise at least one of a Self-encrypting Drive (SED), a Hard Disk Drive (HDD), a Solid State Drive (SSD), Non-Volatile Memory, flash memory, NAND flash memory and Random Access Memory (RAM). The IT asset may comprise a computing apparatus, for example a server, a personal computer, a desktop computer, a mobile computer, a laptop, a tablet and a smart phone.

The IT asset may be operated by an operator.

The server may comprise any suitable processing resource.

The server may comprise a management console. The management console may be for operation by an administrator. The server may be configured to provide a user interface to display information concerning the IT asset and/or the erasure procedure. The user interface may comprise a user input arrangement to enable an administrator to select the erasure procedure and/or at least one parameter of the erasure procedure and/or to initiate, control or stop the erasure procedure.

In a further aspect, which may be provided independently, there is provided a management console comprising a user interface for displaying information concerning performance of an erasure procedure at a remote IT asset. The user interface may comprise a user input arrangement for selecting the erasure procedure and/or at least one parameter of the erasure procedure and/or to and/or to initiate, control or stop the erasure procedure.

The method may comprise receiving an erasure request, for example from the operator, at the IT asset.

The method may comprise transmitting the erasure target signal to the server in response to receipt of the erasure request.

The method may comprise only transmitting the erasure target signal from the IT asset to the server in response to identification of the operator of the IT asset as an authorised operator of the IT asset.

The method may comprise transmitting the erasure target signal from the IT asset to the server in response to an attempt to access the IT asset by an unauthorized operator.

The method may comprise transmitting the erasure target signal from the IT asset to the server in response to booting of the IT asset.

The method may comprise repeatedly transmitting the erasure target signal from the IT asset to the server.

The method may comprise transmitting the erasure target signal from the IT asset to the server in response to expiry of a period such as a lifetime of the IT asset.

The method may comprise transmitting the erasure target signal from the IT asset to the server upon expiry of a pre-defined quarantine period after receipt of an erasure request at the IT asset.

The method may comprise transmitting the instructions from the server to the IT asset.

The method may comprise transmitting the instructions from the server to a data eraser apparatus for erasing data from the IT asset, which data eraser apparatus is separate from the IT asset.

The instructions may comprise the erasure procedure, or at least one feature of the erasure procedure, or at least some software components for performing the erasure procedure. The instructions may comprise configuration data representative of said erasure procedure or said at least one feature of the erasure procedure. The configuration data may be representative of at least one of erasure procedure or type of erasure procedure to be performed, overwriting pattern or payload or type of overwriting pattern or payload to be used, verification procedure or type of verification procedure to be used, erasure standard to be used, requirement for acceptance of erasure procedure as successful.

The instructions may comprise instructions for initiating the erasure procedure.

The erasure procedure, or at least one feature of the erasure procedure, or at least some software components for performing the erasure procedure, may be stored on the erasure client.

The method may comprise storing the erasure procedure, or at least one feature of the erasure procedure, or at least some software components for performing the erasure procedure on the erasure client.

The instructions may comprise instructions to an operator, for example an operator having access to the IT asset or able to communicate with the IT asset.

The instructions may be selected in dependence on the profile or said at least part of the profile. The instructions may concern performance of the identified erasure procedure, or said at least one feature of the erasure procedure.

The instructions may comprise instructions for partially or wholly destroying the IT asset.

The method may comprise transmitting an indication of a pre-defined quarantine period from the IT asset to the server.

The method may comprise transmitting the instructions from the server to the erasure client upon expiry of the quarantine period after receipt at the server of the erasure target signal.

The method may comprise initiating the erasure procedure in response to receipt of the transmitted instructions at the erasure client.

The method may comprise performing the erasure procedure.

The method may comprise transmitting information relating to the status and/or progress of the erasure procedure from the erasure client to the server, for example to permit the server and/or an administrator to remotely monitor the status and/or progress of the erasure procedure at the server.

The method may comprise re-configuring the erasure procedure according to the status or progress of the erasure procedure. The method may comprise replacing the erasure procedure with an alternative erasure procedure according to the status and/or the progress of the erasure procedure.

The method may comprise locking the IT asset during execution of the erasure procedure so as to prevent user interaction with the IT asset during execution of the erasure procedure.

The method may comprise executing an erasure verification procedure after completion of the erasure procedure to verify that the data has been erased from the memory of the IT asset in compliance with the erasure specification.

Executing the erasure verification procedure may comprise:
  reading data stored at selected addresses in the memory of the IT asset after completion of the erasure procedure; and
  checking that the read data is consistent with the erasure specification.

The method may comprise providing an erasure report including the results of the procedure such as the erasure procedure used or erasure verification results.

The method may comprise transmitting the erasure verification report to the server to permit an erasure administrator to remotely review the erasure verification report. The method may comprise storing the erasure verification report in a database. The method may comprise storing the erasure verification report to the memory of the IT asset.

The method may be defined by software.

At least some of the software may be stored or installed at the IT asset and/or the data eraser.

The software may comprise a dedicated operating system which is independent of an existing operating system of the IT asset and an erasure application running on the dedicated operating system. The dedicated operating system may be booted into from any appropriate source, for example from a CD, USB, across the network PXE. The dedicated operating system may be booted on the IT asset by an operator. The erasure application may be capable of independently communicating with the server. The erasure application may define a generic erasure procedure. The instructions transmitted from the server may modify or supplement the generic erasure procedure so as to tailor the generic erasure procedure according to the profile and, optionally, also the erasure specification. The method may be defined by the erasure application.

The software may be installed on the existing operating system of the IT asset. For example, the software may comprise an erasure agent installed on the existing operating system of the IT asset. The method may comprise installing the erasure agent at the IT asset or the erasure agent may be pre-installed at the IT asset.

The method may be defined by the erasure agent and the erasure application. The erasure agent may comprise or may control operation of the erasure application. The erasure agent may determine that the dedicated operating system of the erasure application should be booted into in preference to the existing operating system of the IT asset so as to initiate the erasure procedure.

When executed, the software, for example the erasure agent or erasure application, may cause the IT asset to be interrogated to determine the profile or at least one feature of the profile of the IT asset.

When executed, the software, for example the erasure agent or erasure application, may cause the profile or at least one feature of the profile of the IT asset to be transmitted from the IT asset to the server.

When executed, the software, for example the erasure agent or erasure application, may cause the erasure target signal to be transmitted from the IT asset to the server.

Initiating the erasure procedure may comprise at least one of:
transmitting erasure procedure configuration information from the server to the erasure client;
configuring the erasure application according to the erasure procedure configuration information; and
initiating execution of the configured erasure application.

Initiating the erasure procedure may comprise:
transmitting the erasure application from the server to the erasure client; storing the erasure application on the erasure client; and initiating execution of the erasure application.

The method may comprise:
checking the validity of a software licence for the erasure agent and/or the erasure application; and
only initiating execution of the erasure agent and/or the erasure application on detection of a valid software licence for the erasure agent and/or the erasure application.

The method may comprise comparing a hardware profile of the IT asset to an expected hardware profile. The expected hardware profile may be stored at the server and/or at a database located remotely from the IT asset. This may enable an audit of the hardware profile of the IT asset against the expected hardware profile.

The method may comprise sending a password or code from the server to the erasure client to authenticate the server to the erasure client. The method may comprise sending a password or code to the server to authenticate the erasure client to the server.

According to another aspect or an embodiment, which may be provided independently, there is provided a system for use in repurposing, erasing data from, and/or or disposing of an IT asset, the system comprising a server located remotely from the IT asset, and wherein the server is configured to:
receive a signal, for example an erasure target signal, from the IT asset;
receive at least part of a profile of the IT asset; and
in response to receipt of the signal, for example the erasure target signal, at the server, identify an action to be performed in relation to the IT asset based at least in part on the profile or part of the profile of the IT asset.

The system may comprise an erasure client located remotely from the server,
wherein the server is configured to transmit instructions to the erasure client, which instructions at least partially define the action to be performed in relation to the IT asset, and
wherein the erasure client is configured so that, in response to receipt of the instructions from the server, the erasure client performs the action in relation to the IT asset.

The system may comprise one or more databases configured for communication with the server. The one or more databases may store at least one of:
an identifier for one or more IT assets;
a hardware profile for one or more IT assets;
a data erasure specification for one or more IT assets; and
data erasure results such as data erasure verification results for one or more IT assets.

According to another aspect or an embodiment, which may be provided independently, there is provided a server for use in repurposing, erasing data from, and/or or disposing of an IT asset, the server being configured to be located remotely from the IT asset and to:
receive a signal, for example an erasure target signal, from the IT asset;
receive at least part of a profile of the IT asset; and
in response to receipt of the signal, for example the erasure target signal, identify an action to be performed in relation to the IT asset based at least in part on the profile or part of the profile of the IT asset.

The server may be further configured to:
transmit instructions to an erasure client, which instructions at least partially define the action to be performed in relation to the IT asset,
wherein, the erasure client, in response to receipt of the instructions, performs the action in relation to the IT asset.

A further aspect or embodiment, which may be provided independently, comprises an erasure client, wherein the erasure client is configured to interrogate the IT asset to determine a profile, or at least one feature of a profile, of the IT asset and to transmit the profile or said at least one feature of the profile to a remote server and/or to configure an erasure procedure in dependence on the determined profile or said determined at last one feature of the profile.

A further aspect or embodiment, which may be provided independently, comprises an erasure agent for installation at an IT asset, wherein the erasure agent is configured to interrogate the IT asset to determine a profile, or at least one feature of a profile, of the IT asset and to transmit the profile or said at least one feature of the profile to a remote server and/or to configure an erasure procedure in dependence on the determined profile or said determined at last one feature of the profile.

The erasure client may be provided with the IT asset.

The erasure client may be provided separately from the IT asset. The erasure client may comprise a data eraser apparatus for erasing data from the IT asset, which data eraser apparatus is separate from, and/or independent of, the IT asset.

The erasure client may comprise an erasure application.

The erasure application may be provided with the IT asset. The erasure application may be stored in a memory of the IT asset. The erasure application may be configured to run on a dedicated operating system of the IT asset but which is independent of an operating system of the IT asset.

The erasure client may comprise the erasure agent. The erasure agent may be provided with the IT asset. The erasure agent may be stored in a memory of the IT asset. The erasure agent may be configured to run on an operating system of the IT asset. The erasure agent may be configured to work in combination with the erasure application.

The erasure application may be provided separately from, and/or independently of, the IT asset. The erasure application may be provided with the data eraser apparatus. The erasure application may be stored in a memory of the data eraser apparatus.

A further aspect or embodiment, which may be provided independently, comprises an erasure agent for installation at an IT asset, wherein the erasure agent is configured to receive from a remote server configuration data representative of an erasure procedure, or at least one feature of an erasure procedure, and to perform an erasure procedure in dependence on the configuration data.

The method may comprise using a bi-directional communications framework that sends data between the IT asset and the server (possibly) via a proxy service. The server may comprise a remote system or a secondary system. This may enable dynamic control and configuration of an erasure application (either at run time or via the receipt of a configuration file) to erase data from the IT asset.

The erasure agent can communicate information about the IT asset to a remote location, for example to the server, so as to identify the IT asset and provide a report about the hardware profile of the IT asset. The hardware profile may include details of at least one of the connected data storage, hardware information, hardware specifications, hardware model numbers, hardware serial numbers, the results of automated hardware tests and the like.

The hardware profile and/or erasure specification may be processed by a remote administrator who can determine and create a specific erasure procedure in real time or at a given interval for the IT asset. This allows a complex array of factors to be taken into account and allows the decision making process to be centralized and approvable by an authorized administrator who does not need to be present at the location of the IT asset being erased.

The method may comprise creating an array of pre-defined erasure procedures. For example, the administrator may create an array of pre-defined erasure procedures, with each erasure procedure corresponding to a known hardware profile. The method may comprise automatically sending one or more of the pre-defined erasure procedures to the erasure application, based on the information provided by the IT asset. The information provided by the IT asset may include custom data entered by the operator when the erasure application is initially booted, such as an ID relating to the origin of the IT asset e.g. the owner, location or the like. The information provided by the IT asset may include an indication of the presence of drive technologies such as hybrid drives (i.e. automatically destroy) or SSDs (apply specific procedure).

A real time assessment and validation (or otherwise) of the erasure feasibility is possible based on the erasure specification i.e. the custom requirements for (or provided by) users of the IT assets. In the case of an IT Asset Disposition service provider (ITAD), a real time assessment and validation (or otherwise) of the erasure feasibility is possible based on the erasure specification i.e. the custom requirements for the ITAD's customer i.e. the original owner of the IT asset being erased. For example, the erasure specification may specify an erasure level X according to standard Y for hardware Z.

The results of the feasibility analysis are returned enabling a remote administrator to make an informed decision about the next steps. For example, the remote administrator may decide to start the erasure (if a green light is given regarding the feasibility assessment). Alternatively, the remote administrator may decide to reconfigure the erasure procedure to account for caveats, for example, the IT asset being targeted for erasure may contain bad block, thus requiring additional erasure steps or destructive steps to be applied. The remote administrator may decide to declare that the IT asset should be destroyed because it is not feasible for the IT asset to be erased to meet the erasure specification.

The method may comprise handling of an IT asset which includes or uses one or more encryption technologies. For example, if Bitlocker software encryption is detected, a remote administrator can apply countermeasures to bypass this obstruction or flag the encryption and consider a different action for the IT asset. If a drive is an SED and locked by the Opal security subsystem, the administrator can highlight the necessary manual actions to an operator on site.

The administrator can perform a real-time assessment of expected return on investment for a given IT asset based on the hardware profile and/or the results of tests.

The administrator can be provided with visibility of IT assets that are ready to be retired by receiving notifications on a portal or a similar apparatus. Based on knowledge about the erasure specification or erasure service required for a given IT asset, the erasure procedure can be defined or prescribed and delivered by sending configuration information to an erasure application that may or may not work in tandem with an erasure agent installation running on top of an operating system of the IT asset. The erasure application can also be downloaded to the IT asset on demand. This removes the need for the user of the IT asset to create any installation media or ISO image to run the erasure application, thus reducing the requirement for intervention at the site of the IT asset.

An action can be initiated by a remote administrator with regard to the connected IT asset. For example, the remote administrator can request or arrange for the IT asset to be quarantined if the IT asset is not ready for erasing. The IT asset may be erased according to the defined erasure procedure. The erasure procedure can be applied to a single IT asset. The same erasure procedure may be applied to a plurality of IT assets. Different erasure procedures may be applied to different IT assets of a plurality of IT assets. The IT asset may be destroyed if it is determined that there is no value to be found from refurbishing the IT asset.

Further feedback can be sent to the remote administrator that can be critical to aid further decision making process. For example, any errors encountered during execution of the erasure procedure which violate the erasure specification may be sent to the remote administrator so that the administrator may make informed decisions about erasure of data from the IT asset in view of the errors.

While the technical processes for data erasure are commonly known in the art, in practice it is a broader concept than generally understood, incorporating a series of international sanitization standards that inform or mandate (depending on the entity—i.e. government entities must adhere to standards, whereby other organizations may apply global policies based on published standards and/or their own internal knowledge) how erasure should or must be performed. Furthermore, a series of different device interfaces and command protocols is coupled with a changing technological landscape for storage that includes the emergence of SSD technologies or the ubiquity of encryption. It can be said, therefore, that execution of an erasure processes, should be performed by a knowledgeable person with professional tools in order to be compliant, meet standards and apply the correct process in certain situations.

It is unreasonable to expect the majority of organizations to retain the correct level of knowledge or expertise about the requirements for this comprehensive erasure of storage. Indeed, the nature of today's technology means that while storage logically operates in a simplistic way (i.e. via easily accessible file system structure), the underlying physical media deployed may be unclear, even to skilled persons. Moreover, handling exceptions such as errors or exceptional events; retaining knowledge of disposal policies; applying correct processes or retaining the correct level of evidence via reporting, illustrates further the highly nuanced nature of storage sanitation.

It is conceivable that a designated expert could be hired or, if required, trained in the art of data erasure. However, this person would only be present at one specific site at any given time, meaning that challenges would start to emerge when attempting erasure at various geographical locations. The individual expert or experts would have to travel to perform on-site, the problem becoming more exacerbated in larger, more-widely-distributed organizations. This creates a need to offer proficient media erasure applications that can be remotely administered and configured dynamically to ensure the efficacy of the process and, hence, compliance with standards, and the avoidance of fines through data breaches from the improper sanitization method applied. Accordingly, the methods and systems described herein may allow a knowledgeable or expert administrator to manage the re-purposing or disposal of IT assets from a remote location.

Situations may exist where desktop/laptop computers are retired from use but are retained at the original location, prior to it being erased. In some situations the contents of computer's storage may need to be retained for an arbitrary period of time. This could be for a variety of reasons, one example being that a user's contents/settings/etc need to be migrated to a different computer before the previous one can be erased, thus ensuring that no essential data is missed during the migration period. Alternatively, there may be a policy that points toward a retention period for old hardware when an employee leaves or changes machine, just in case there is a need to access their 'old' data at a later point. Once these machines are to be erased a service is required to begin the erasure of the asset by a remote service provider who should be able to deploy and/or configure an erasure application on the target machine.

When performing erasure of assets, particularly in IT recycling plants (where high volumes are encountered), using a combination of information held already retained in a local repository (i.e. asset management system), such as the requirements set by those customers that are having their tech refurbished, and the results of hardware profiling for a given machine. Without the proper integration between an asset management and erasure tools, it is required to coordinate process information between two disparate systems. This can lead to mistakes in the processing assets, resulting in wasted time or insufficient erasure processes applied.

In existing distributed erasure systems, an agent's erasure process behavior is fixed at the time the erasure module is installed. There may be some configuration to understand file systems or create network connectivity, but this does not reflect the main security functions required during an erasure process: the correct actions and procedure applied to a device. An erasure application would likely have to be completely replaced or reconfigured locally by an operator, who (as highlighted earlier) should retain the necessary knowledge to do the job properly. Predefined or statically coded erasure actions reduces the ability of a remote entity to configure the software to securely erase the target storage, particularly if there is no feedback loop in place regarding the properties of the erasure target. A static or 'dumb' process will apply a series of pre-defined steps that may or may not be enough.

This lack of flexibility creates a situation where addressing varying requirements or applying necessary deviations from a default process becomes challenging, especially when attempting to account for a myriad of standards/policies, storage types or other underlying factors. Critically, it adds a significant amount of time to the process as the flexibility provided by doing this at run time or as a reactive step enables quick and decisive actions to be taken in an often security critical context. This also applies to situations where there is a declared requirement to consider the need for destructive processes (in recycling centers, if an asset has little or no worth, it is not financially viable to waste resources on refurbishing it so a quick destructive decision—based on the understanding of the hardware—is also valuable).

The methods and systems disclosed herein provide the ability to configure the erasure process on a per-asset basis 'on the fly', or assess in real time the hardware status of an IT asset.

Currently known remote erasure applications can take too simplistic a view of the IT asset being erased and do not present any opportunity to adjust the data erasure procedure dynamically. This may result in the inability to issue the correct erasure commands or configure other critical (in the view of those whose IT assets are being erased) requirements such as compliance with standards. For example, those who abide by UK erasure standards apply completely different erasure procedures compared with those who follow US erasure standards. Some users of erasure software require an erasure procedure that meets lower security requirements than others. Additionally, there are a range of hard drive technology differences that may cause potential for a data breach or other adverse outcome if they are not detected and handled properly. For example, hybrid drives look and act like HDDs but may represent a security liability for entities who have sensitive data and/or more stringent erasure needs. SSDs also need different handling processes compared to HDDs or hybrid drives. Accordingly, detecting the presence of an SSD can be very important when deciding on a course of action to take. Indeed, some customers may have completely different erasure requirements for an SSD. Some customers may even have a policy that all SSDs should be destroyed.

As pressures on the economic viability of the ITAD industry increase, the systems and methods for use in data erasure described herein facilitate the automation and remote administration of flexible and dynamically configurable data erasure procedures. These features can lead to reduced human (employee) interaction, thus reducing costs. The systems and methods for use in data erasure described herein may also facilitate data erasure progress monitoring and reporting and the processing of errors. The systems and methods for use in data described herein may result in greater satisfaction. The ability to actively deploy dynamic and adaptable erasure procedures to enables the effective remote administration of data erasure and removes the need for local experts.

Features in one aspect may be applied as features in any other aspect in any appropriate combination. For example, method features may be applied as apparatus features and vice versa.

BRIEF DESCRIPTION OF THE DRAWINGS

A system and method for use in data erasure will now be described by way of non-limiting examples only with reference to the drawings of which.

DETAILED DESCRIPTION

Figure 1:
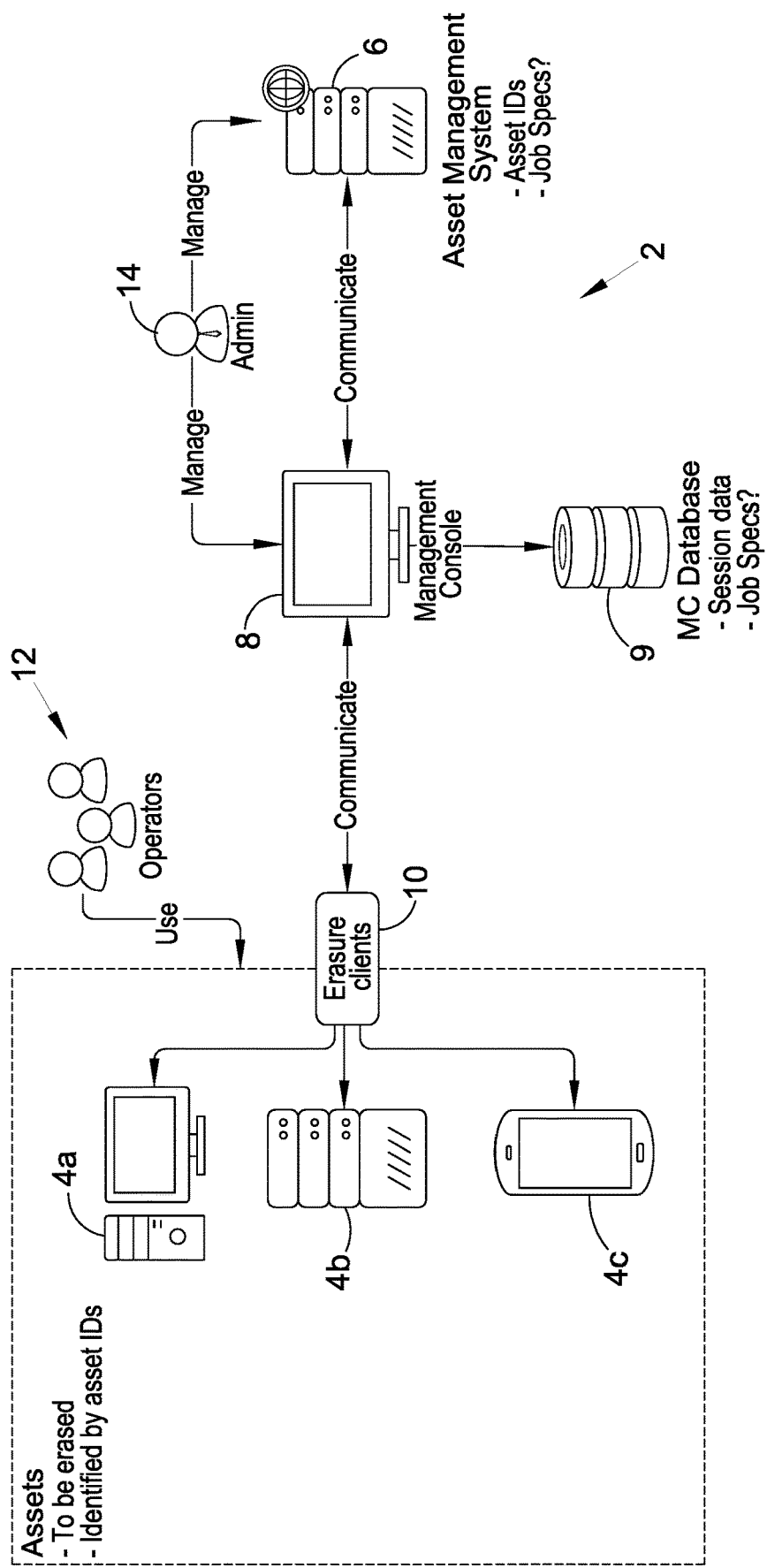
FIG. 1 schematically illustrates IT assets and a system for use in repurposing or disposing of the IT assets.

With reference to FIG. 1 there is shown a system generally designated 2 for use in repurposing or disposing of IT assets in the form of a personal computer or a server 4a, an apparatus 4b that hosts or defines logical storage units, for example in a Storage Area Network (SAN), and a smart phone 4c. The system 2 includes a remote server in the form of an asset management system 6 which is located remotely from the IT assets 4a, 4b and 4c. The system 2 includes a management console 8. As will be described in more detail below, the IT assets 4a, 4b, 4c and the asset management system 6 are capable of bidirectional communication via the management console 8. The management console 8 may be operated by an administrator 14 who may be knowledgeable or expert in data erasure. In some embodiments, the management console 8 may be omitted so that the IT assets 4a, 4b, 4c communicate directly with the asset management system 6. Accordingly, it should be understood that references below to communication between the IT assets 4a, 4b, 4c and the asset management system 6 may refer to direct communications between the IT assets 4a, 4b, 4c and the asset management 6 or indirect communications between the IT assets 4a, 4b, 4c and the asset management 6 via the management console 8.

The system 2 further includes one or more databases 9 which are configured for bidirectional communication with the asset management system 6 via the management console 8. In use, the asset management system 6 and/or the one or more databases 9 may store information relating to the identification and hardware profiles of the IT assets 4a, 4b and 4c. In addition, the asset management system 6 and/or the one or more databases 9 may store information relating to a data erasure specification which may be defined by a user, operator or owner of the IT assets 4a, 4b and 4c and/or which may be defined for compliance with regulations, legislation and/or one or more standards. As will be described in more detail below, the asset management system 6 and/or the one or more databases 9 may store one or more data erasure applications and/or information generated during a data erasure procedure including data erasure verification information.

The system 2 further includes one or more erasure clients 10. Each erasure client 10 includes an erasure application described in more detail below. Each erasure application may be stored in a memory of a corresponding one of the IT assets 4a, 4b and 4c. Alternatively, each erasure application may be stored in the memory of, or installed on, a dedicated data eraser apparatus which is separate from the IT assets 4a, 4b and 4c, wherein each dedicated data eraser apparatus may be configured for bidirectional communication with one or more of the IT assets 4a, 4b, 4c. When present, the management console 8 may act as a proxy for the erasure clients 10.

Figure 2:
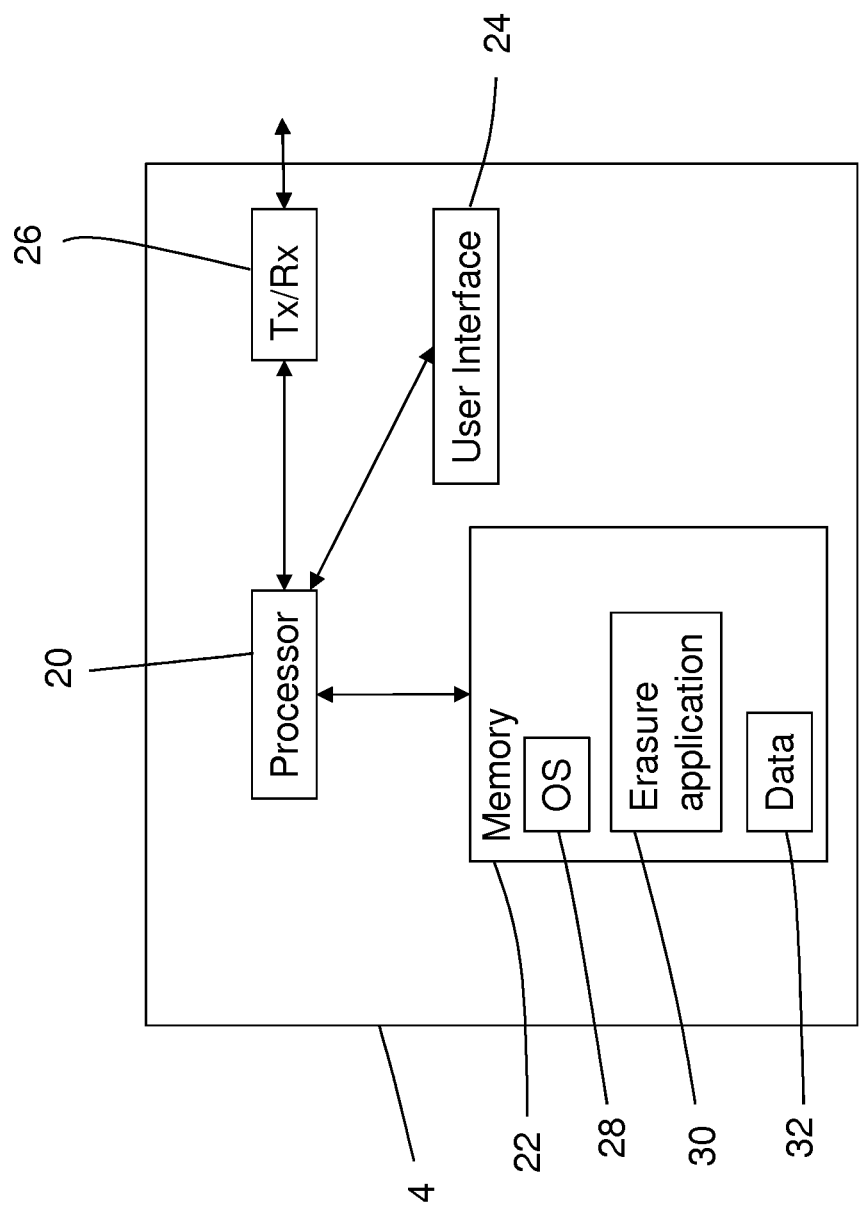
FIG. 2 schematically illustrates an IT asset.

FIG. 2 illustrates a generic IT asset generally designated 4 which is intended to be representative of any of the IT assets 4a, 4b and 4c. The IT asset includes a processor 20, a memory 22, a user interface 24 and a communication interface 26. The memory 22 stores an operating system 28, an erasure application 30 and other data 32 which may be sensitive data. The erasure application 30 includes a dedicated operating system which is independent of the operating system 28. It should be understood that the memory 22 may comprise at least one of random access memory (RAM), a Hard Disk Drive (HDD), a Self-encrypting Drive (SED), a Solid State Drive (SSD), Non-Volatile Memory, flash memory, NAND flash memory. The memory 22 may identify or be associated with logical storage units.

The erasure application 30 may be defined in software and/or firmware. This can be at the discretion of an operator 12 during any point throughout the life-cycle of the IT asset 4. This could also be part of an end-of-life process for the IT asset 4 i.e. as part of the data migration process when the IT asset 4 is replaced with a new IT asset (not shown). The erasure application 30 is programmed with the location/address of the asset management system 6 and is configured to apply processes such as scanning to ensure that a working network connection is available and to establish contact with the asset management system 6. The erasure application 30 may be configured to raise flags to warn an operator 12 if a working network connection is not found and/or if contact with the asset management system 6 cannot be established.

Figure 3:
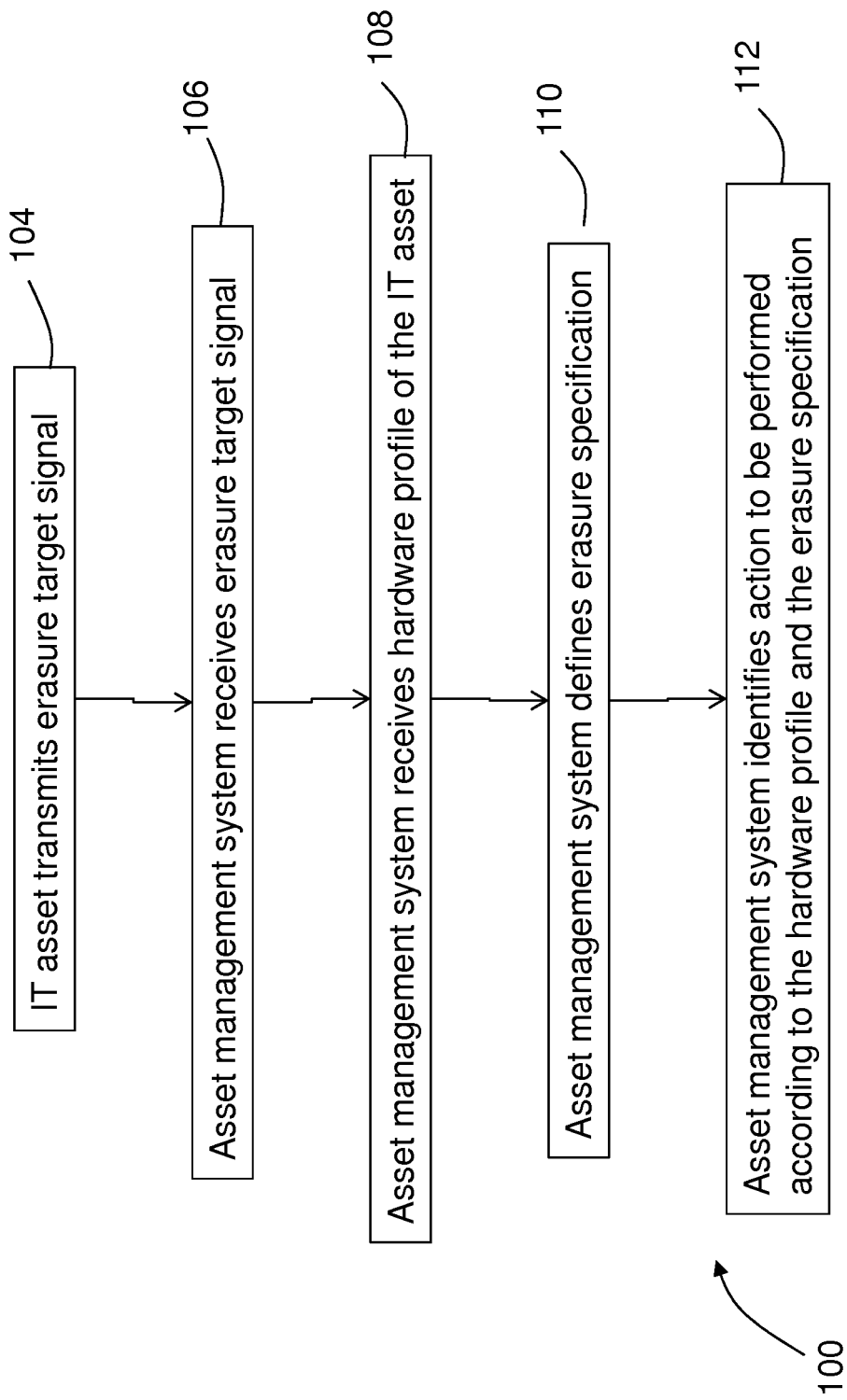
FIG. 3 schematically illustrates part of a method for use in repurposing or disposing of the IT asset of FIG. 2.

The erasure application 30 and the asset management system 6 co-operate so as to implement a data erasure method generally designated 100 described with reference to FIG. 3. In a first step, the IT asset 4 transmits an erasure target signal to the asset management system 6 at step 104. Alternatively, the asset management system 6 may specify a quarantine period for the IT asset 4 which only transmits the erasure target signal to the asset management system 6 upon expiry of the quarantine period. In a further alternative, an operator 12 may input a quarantine period to the IT asset 4 which only transmits the erasure target signal to the asset management system 6 upon expiry of the quarantine period. Inputting a quarantine period in this way may allow the contents of the IT asset 4 to be retained for an arbitrary period of time. This may, for example, allow the contents and settings of the IT asset 4 to be migrated to a different IT asset before the IT asset 4 is erased thus ensuring that no data is lost during data migration. This may also facilitate compliance with an IT policy which requires that the IT asset 4 be retained for a predefined quarantine period when a user's employment ceases or when a user changes IT asset to permit the data on the IT asset 4 to be accessed during the predefined quarantine period.

The asset management system 6 receives the erasure target signal at step 106. The asset management system 6 receives a profile of the IT asset 4 at step 108. For example, the asset management system 6 receives the profile of the IT asset 4 directly from the IT asset 4. Alternatively, the asset management system 6 receives an identifier (ID) from the IT asset 4 and the asset management system 6 then uses the identifier for the IT asset 4 to determine the profile of the IT asset 4 from information stored in the asset management system and/or the one or more databases 9. If required, the asset management system 6 can request additional profile or ID information from the IT asset 4. The ID may include a customer ID. If the asset management system 6 does not recognise the ID, the asset management system 6 may request that the IT asset 4 provides further ID information.

The method 100 continues at step 110 with the asset management system 6 defining an erasure specification, for example by identifying an erasure specification stored in the asset management system 6. Additionally or alternatively, the asset management system 6 may receive an erasure specification from the one or more databases 9. The erasure specification may take the form of a specification for data erasure and/or verification of data erasure. For example, the erasure specification may take the form of a specification for verification of over-writing of data across a predetermined proportion of an addressable area of the memory 22 of the IT asset 4. The erasure specification may be defined by a user, operator or owner of the IT asset 4. The erasure specification may be defined for compliance with regulations, legislation and/or one or more standards for one or more countries or territories.

The method 100 continues at step 112 with the asset management system 6 identifying a suitable erasure procedure for erasing data from the memory of the IT asset 4 according to the hardware profile and the erasure specification.

Figure 4:
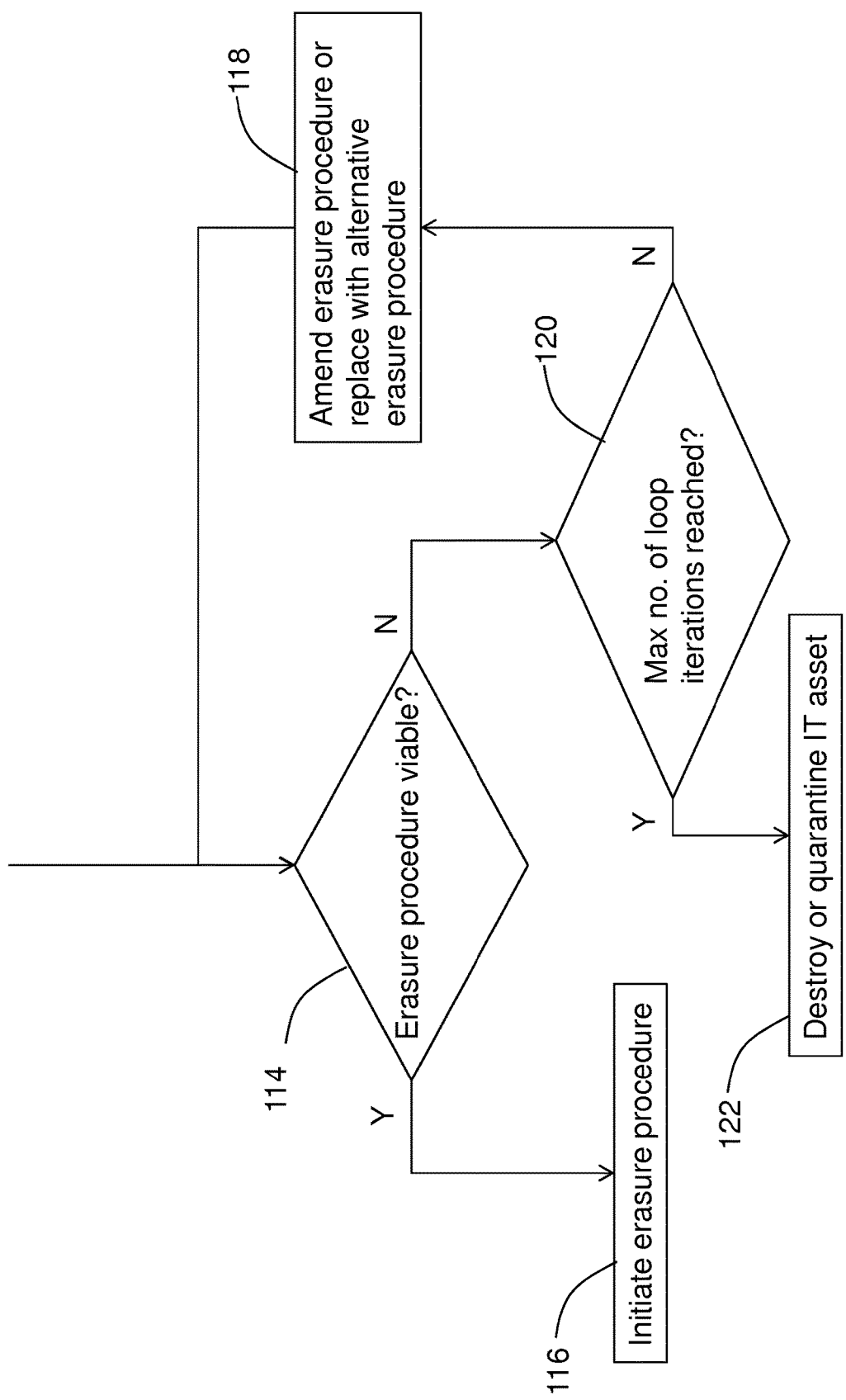
FIG. 4 schematically illustrates a further part of the method of FIG. 3 for use in repurposing or disposing of the IT asset of FIG. 2.

As described with reference to FIG. 4, the method 100 continues at step 114 with the erasure application 30 checking to ascertain whether the identified erasure procedure 114 is viable. This may require the erasure application 32 reboot IT asset 4. Step 114 may comprise checking whether the identified erasure procedure 114 is technically viable. Additionally or alternatively, this step may comprise checking whether the identified erasure procedure 114 is commercially viable, for example based on market value or price information of the IT asset 4 stored in the asset management system 6 or the one or more databases 9. If it is determined that the erasure procedure is viable, the erasure procedure is initiated at step 116. However, if it is determined that the erasure procedure 114 cannot meet the erasure specification for the hardware profile of the IT asset 4, the erasure procedure may be repeatedly amended or replaced with an alternative erasure procedure by repeatedly executing step 118 until it is determined that the erasure procedure is viable or a predetermined maximum number of loop iterations is reached. It should also be understood that amending or replacing the erasure procedure with an alternative erasure procedure at step 118 may be performed automatically or may be performed manually by the administrator 14. If it is determined that the predetermined maximum number of loop iterations is reached at step 120, a message is transmitted from the asset management system 6 to the erasure application 30 at step 122 to notify the operator 12 via the user interface 24 that data erasure is not viable and that the IT asset 4 should be destroyed. Alternatively, a message is transmitted from the asset management system 6 to the erasure application 30 at step 122 to notify the operator 12 via the user interface 24 that the IT asset should be placed in quarantine. A flag may also be raised at the management console 8 at step 122 to notify the administrator 14 that data erasure is not viable and that the IT asset 4 should be destroyed or placed in quarantine.

The erasure procedure may be initiated by transmitting instructions from the asset management system 6 to the erasure application 30 to configure the erasure application according to the erasure procedure configuration information, and initiating execution of the configured erasure application.

During the data erasure procedure, the erasure application 30 transmits information relating to the status and/or progress of the erasure procedure from the IT asset 4 to the asset management system 6. During the data erasure procedure, the administrator 14 may remotely monitor the status and/or progress of the erasure procedure. The asset management system 6 or the administrator 14 may re-configure the erasure procedure or replace the erasure procedure with an alternative erasure procedure according to the status and/or progress of the erasure procedure. If the erasure procedure fails or if errors are generated during execution of the erasure procedure, the asset management system 6 or the administrator 14 may abort the erasure procedure and initiate an alternative erasure procedure. Alternatively, the asset management system 6 or the administrator 14 may recommend that the IT asset 4 be destroyed. In the latter case, a message is transmitted from the asset management system 6 to the erasure application 30 at step 122 to notify the operator 12 via the user interface 24 that data erasure is not viable and that the IT asset 4 should be destroyed. The erasure application 30 locks the IT asset 4 so as to prevent the operator 12 from interacting with the IT asset 4 during execution of the erasure procedure.

After completion of the erasure procedure, the erasure application 30 executes an erasure verification procedure to verify that the data has been erased from the memory 22 of the IT asset 4 in compliance with the erasure specification. For example, the erasure application 30 may read data stored at selected addresses in the memory 22 of the IT asset 4 after completion of the erasure procedure and check that the read data is consistent with the erasure specification. The erasure application 30 generates an erasure report which may include details of the erasure procedure used and/or results of the erasure verification procedure and transmits the erasure report to the asset management system 6. Additionally or alternatively the administrator 14 may remotely review the erasure report. The asset management system 6 stores the erasure report. Additionally or alternatively the erasure report may be stored in the one or more databases 9. Optionally, the erasure application 30 may store the erasure report to the non-volatile memory 22 of the IT asset 4.

The foregoing systems and methods provide flexible data erasure solutions which may allow any errors generated or any exceptional events occurring during the data erasure procedure to be handled essentially in real-time or "on the fly" by the single remote administrator 12 who may be knowledgeable or expert in data erasure. In addition, the administrator 12 may be familiar with IT asset disposal policies or may have access to IT asset disposal policies stored on the asset management system 6 and/or the one or more databases 9 so that the administrator 12 can make informed decisions about the viability of data erasure for a given IT asset.

The foregoing systems and methods allow the correct data erasure procedures to be applied and/or allow the correct level of evidence to be generated and/or stored to demonstrate compliance with data erasure requirements. Such data erasure requirements may be defined by a user, operator or owner of an IT asset or may be defined for compliance with regulations, legislation and/or one or more standards in one or more different countries or territories. The foregoing systems and methods may allow a variety of different IT assets with a myriad of different hardware profiles to be reliably and efficiently refurbished or disposed of according to controlled procedures which are verifiable against legislation, regulations and/or standards. The foregoing systems and methods may reduce or minimise the time required for a local operator to intervene at the IT asset 4 during data erasure. This may be particularly advantageous during refurbishment or disposal of multiple IT assets with different hardware profiles distributed across one or more different sites. Such features and advantages are not provided by known methods of data erasure.

Some embodiments may involve the delivery of a configuration package to the IT asset 4 when the IT asset 4 has finished a quarantine period and is ready to become an active erasure target. The IT asset 4 that will later become the erasure target has the erasure application 30 stored in memory. This can be at the discretion of a user during any point throughout the IT asset's lifecycle. This could also be part of an end of life process i.e. as part of the data migration process from an old laptop to a new one.

In some embodiments, the erasure application 30 is provided with an IT asset ID (for example from an operator 12 through the user interface 24) upon booting of the IT asset. The erasure application 30 then starts a session with the asset management system 6, sending custom data in order to identify the IT asset 4 based on information stored in the asset management system 6 and/or one or more databases 9. The asset management system 6 processes the information and understands that there is a new erasure target available. Each IT asset 4a, 4b, 4c is given a unique ID to uniquely identify it.

The asset management system 6 can request extra asset data from the erasure application 30. Based on the information returned from the erasure application 30, the asset management system 6 may create or define an erasure procedure. Additionally or alternatively, the administrator 14 can create or define the erasure procedure at the asset management system 6 and send that to the erasure application 30.

The administrator 14 can develop a custom erasure procedure based on the real time information that has been provided by the erasure application 30. This may be due to the hardware encountered, the quality of the test results or the requirements of the previous owner of the IT asset 4. The erasure procedure can contain a multitude of actions and different outcomes, such as start erasing according to a specific erasure specification, go to quarantine or be destroyed.

If the erasure procedure contains an erasure action (including the method to be applied), the erasure application 30 parses it and determines if it is feasible or not (there are a multitude of technical reasons why something may not be possible) and sends a successful/invalid message to the asset management system 6.

If feasible, the erasure application 30 sends a positive response and starts erasing, according to the determined configuration. At the end of the process, the management console 8 automatically fetches a report and notifies the asset management system 6, which can pull the erasure report from the management console 8, if needed.

Figure 5:
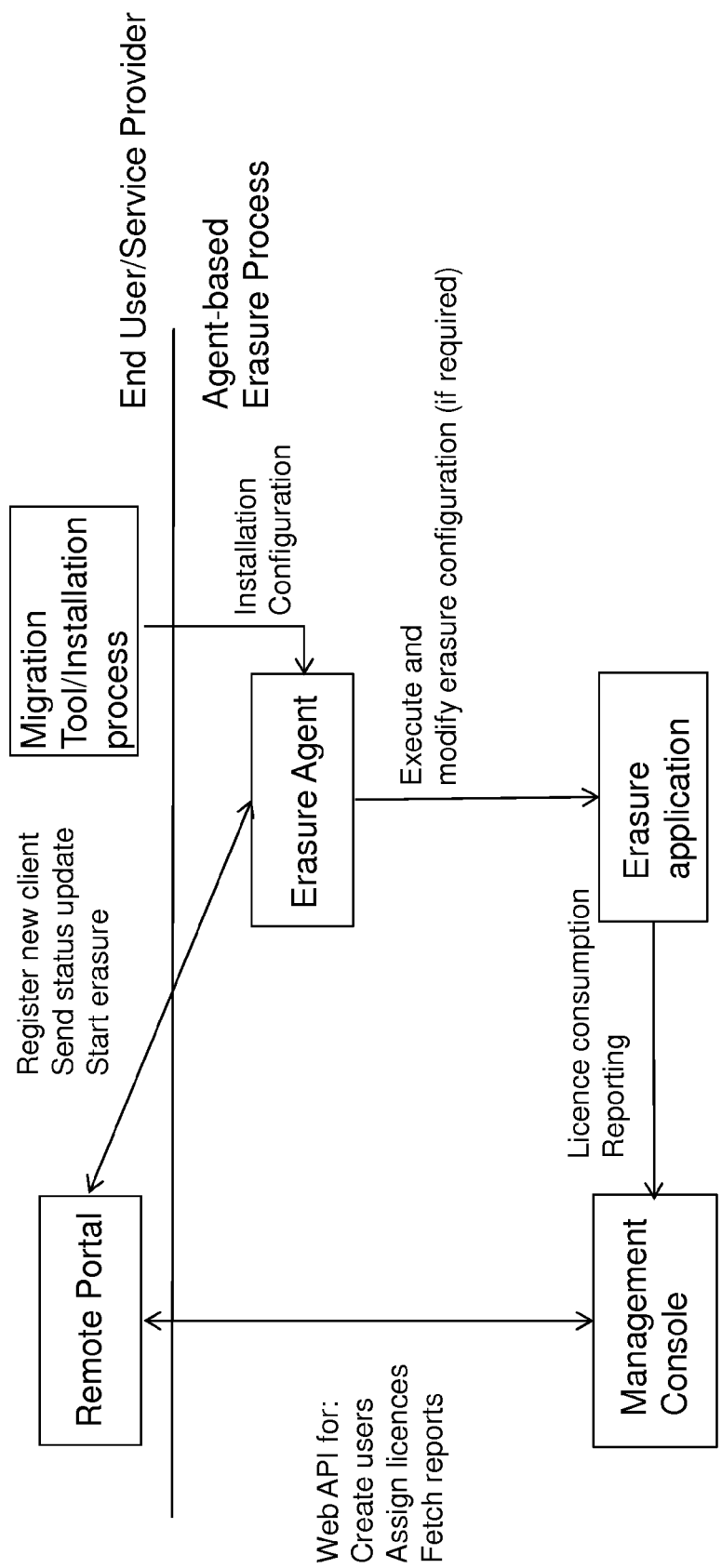
FIG. 5 is a high-level representation of the use of an erasure agent.

One of ordinary skill in the art will understand that various modifications are possible to the foregoing system and methods. For example, the method for use in repurposing or disposing of the IT asset 4 may be implemented or controlled by an erasure client which includes the erasure application 30 and an erasure agent which works in combination with the erasure application 30. The erasure agent runs on the operating system 28 of IT asset 4. The erasure agent may for example act as a configuration and communication facilitator. FIG. 5 provides a top-level representation of a method implemented or controlled by an erasure agent running on the operating system 28 of IT asset 4 and working in combination with the erasure application 30. The erasure agent acts as a "middle man" between a remote location, delivering information about the IT asset 4 and receiving erasure configuration instructions to be migrated with the erasure application. The erasure agent can call on a module to initiate the modification of a boot record of the IT asset 4 that enables the booting of the erasure application (instead of the original operating system 28) once the IT asset 4 is (automatically or manually) restarted. The erasure application 30 may be installed as part of the original agent installation or the agent may be able to request the erasure application 30 from a remote location. The agent is installed on top of the current operating system 28 and performs the necessary communications with the asset management system 6 shown in FIG. 1 or some kind of administrative web portal as shown in FIG. 5. The agent handles the receipt of the configurations data and stores this and applies it to the erasure application 30. The agent polls for instructions and, once given the green light, initiates the rewriting of the boot record and the rebooting of the IT asset 4 so erasure software is booted into and the erasure application 30 run to erase date from the IT asset 4.

The erasure procedure may initiated by transmitting the erasure application 30 from the asset management system 6 to the IT asset 4 and saving the erasure application 30 in the memory 22 of the IT asset 4 or elsewhere. The erasure agent may then initiate execution of the erasure application 30 by modifying the boot path so that erasure software including erasure application 30 is launched instead of operating system 28. One of skill in the art will appreciate that the presence of the erasure agent 30 on the IT asset 4 allows the erasure application 30 in some embodiments to be downloaded to the IT asset 4 without any need for the operator 12 to create any installation media or ISO image to run the erasure application, thus avoiding or at least minimising local intervention by an operator 12 at the site of the IT asset 4. The erasure agent may be capable of identifying that the memory 22 is encrypted with Bitlocker or a similar technology and to circumvent or bypass such technology.

It should be understood that the erasure agent is pre-configured with the location/address of the asset management system 6 and is able to apply prerequisite processes such as scanning to ensure that a working network connection is available, and suitable credentials for establishing contact with the asset management system 6. Flags can be raised warning the user if the appropriate settings or hardware (e.g. NIC) are not found. The appropriate settings or hardware found may be compared to expected settings or hardware which may be stored at the asset management system 6 and/or at the one or more databases 9. As such, the erasure agent may enable an audit of the settings and/or hardware of the IT asset 4. The erasure agent communicates across a valid network connection and undertakes various processes with the asset management system 6.

In order to be consistently and uniquely identified, the erasure agent can source a unique ID to be sent to the asset management system 6.

The asset management system 6 can send a password or code to the erasure agent to authenticate the asset management system 6 to the erasure agent. The erasure agent can send a password or code to the asset management system 6 to authenticate the erasure agent to the asset management system 6.

Information required for sharing can be defined, such as serial numbers and other hardware or software information could be shared across the network in use.

The erasure agent can send detailed hardware information across the network to the asset management system 6 to enable the asset management system 6 and/or the remote administrator 14 to determine what kind of erasure procedure the IT asset 4 requires. Alternatively, the erasure agent can "self-configure", based on the hardware profile of the storage or memory 22 of the IT asset 4 and a data erasure specification stored in the memory 22.

Whenever the IT asset 4 is switched on, the erasure agent can first determine if the quarantine period has expired and/or if erasure should begin. The trigger for erasure can be issued in different ways:

The erasure agent polls for instructions to erase itself from the asset management system 6, which can occur during defined intervals, i.e. every 10 mins or the erasure procedure can begin at end of a defined time period (already configured when the erasure agent was installed).

The administrator 14 can set an arbitrary value for an expiration date of the IT asset 4. If the IT asset 4 is booted and this date has been exceeded, the erasure procedure will be executed automatically.

Execution of the erasure procedure may be triggered when access is attempted by an unauthorized person.

If the erasure agent receives instructions to conduct erasure, the erasure application is initiated.

The erasure application may be downloaded across the network.

Configuration data for the erasure application may already be present on the target IT asset 4.

The configured erasure application (which can be part of the originally installed software or received across a network) (if not already present) may be activated on the target IT asset 4.

The erasure agent can notify the asset management system 6 that additional configuration or guidance is required due to exceptions being raised during erasure.

The target IT asset 4 is then configured to directly load the erasure application 30 upon the next boot. The erasure agent may automatically create its own bootable partition and automate the reboot of the target IT asset 4.

The software of the erasure agent is capable of identifying drives encrypted with Bitlocker and of circumventing this technology.

The existing operating system 28 is retained until the erasure begins and can be returned to at any time, or this feature can be disabled remotely by the administrator 14.

Detected encryption features (if present) are bypassed at this stage.

Information can be relayed to the asset management system 6 regarding the status of the IT asset 4 or request any final actions. The erasure application 30 is loaded into the memory 22 and now begins the erasure procedure.

Functionality is included to ensure that the erasure application 30 has a valid license to operate and/or that the operator is an authorized operator.

The erasure procedure can be fully automatic and/or locked to prevent any user interaction.

No display is required at the IT asset 4 but if a display is present, it can be 'locked' to protect against accidental (or otherwise) modification of the erasure procedure.

The erasure application 30 generates a report that can be sent to a defined location across the network.

The status of the IT asset 4 (e.g. successful, cancelled, failed, or other) is reported to a remote location.

The status of the IT asset 4 can also be written to the erased memory of the IT asset 4 as a bootable report.

Any established IDs or references are included as part of the report.

One of ordinary skill in the art will appreciate that various modifications may be made to the foregoing systems and methods. For example, the IT asset 4 may transmit the erasure target signal from the IT asset 4 to the asset management system 6 in response to booting of the IT asset 4. The IT asset 4 may repeatedly transmit the erasure target signal from the IT asset 4 to the asset management system 6. The IT asset 4 may transmit the erasure target signal from the IT asset 4 to the asset management system 6 in response to expiry of a lifetime of the IT asset 4. The IT asset 4 may transmit the erasure target signal from the IT asset 4 to the asset management system 6 in response to an attempt to access the IT asset 4 by an unauthorized user or operator.

The method may comprise receiving the erasure target signal and a pre-defined quarantine period at the asset management system 6 from the IT asset 4 and initiating the erasure procedure upon expiry of the pre-defined quarantine period after receipt at the asset management system 6 of the erasure target signal.

The method may comprise checking the validity of a software licence for the erasure application and only initiating execution of the erasure application on detection of a valid software licence for the erasure application.

The erasure clients 10 may act as one or more data eraser apparatus. The or each data eraser apparatus may be configured to execute the identified erasure procedure. Initiating the identified erasure procedure may then comprise transmitting erasure procedure configuration information from the asset management system 6 to the data eraser apparatus, configuring an erasure application stored in a memory of the data eraser apparatus according to the erasure procedure configuration information, and initiating execution of the configured erasure application to cause the data eraser apparatus to initiate erasure of data from the IT asset 4 according to the data erasure procedure. Alternatively, initiating the identified erasure procedure may comprise transmitting the erasure application 30 from the asset management system 6 to the memory 22 of the IT asset 4, and initiating execution of the erasure application 30 to cause the erasure application 30 to initiate erasure of data from the IT asset 4 according to the data erasure procedure.

In the foregoing systems and methods, the operating system 28 allows the erasure application 30 to be configured and/or installed in the memory 22 of the IT asset. The operating system 28 may then be retained or erased during execution of the data erasure procedure. Alternatively, the erasure application 30 may be installed as firmware, for example in read only memory (ROM) independently of the operating system 28. In such a case, the erasure application 30 may be launched or executed on booting of the IT asset independently of the operating system 28.

Although, three different types of IT assets 4a, 4b and 4c have been described, one of skill in the art will understand that the systems and methods described above may be suitable for use in remotely controlling the erasure of data from an IT asset having a data storage apparatus of any kind. For example, the systems and methods described above may be suitable for use in remotely controlling the erasure of data from at least one of a computing apparatus, for example a server, a personal computer, a desktop computer, a mobile computer, a laptop, a tablet and a smart phone.

One of skill in the art will also understand that the systems and methods described above may be suitable for use in repurposing or disposing of any number of IT assets, for example one or more IT assets. In particular, the systems and methods described above may be particularly suitable for use in repurposing or disposing of a multitude of IT assets distributed around one or more different sites. The systems and methods may be suitable for use in repurposing or disposing of different IT assets sequentially or simultaneously.

The invention claimed is:

1. A method for use in at least one of repurposing, erasing data from, and disposing of an information technology (IT) asset, the method comprising:
transmitting, via a working network connection, from the IT asset to a server located remotely from the IT asset an erasure target signal identifying the IT asset as a target for performance of an erasure procedure, and
upon receiving the erasure target signal by the server, performing steps (i) through (iv);
(i) receiving at the server, via the working network connection, at least part of a profile of the IT asset wherein the profile comprises at least one of:
a hardware profile comprising data representative of at least one of a type of storage device, an operating system, a type of operating system, a file system, a type of file system, a size of the storage device, a security of the storage device, a presence of encryption, an absence of encryption, whether the storage device is secure, and whether the storage device comprises encrypting storage;
data indicating a geographical location of the IT asset;
data indicating an identity of at least one of an owner of the IT asset, an operator of the IT asset, and a user of the IT asset; and
data indicating a preference with respect to data erasure specified by at least one of the owner of the IT asset, the operator of the IT asset, and the user of the IT asset;
(ii) in response to receipt of the erasure target signal at the server, automatically identifying an action to be performed in relation to the IT asset based at least in part on the profile, the action specifying an instruction to start erasing the IT asset according to a specific erasure specification;
(iii) transmitting, via the working network connection, instructions from the server to an erasure client, wherein the instructions at least partially define the action to be performed in relation to the IT asset; and
(iv) in response to receipt of the instructions at the erasure client, performing the action in relation to the IT asset;
wherein the erasure client comprises an erasure application, the erasure application is at least one of provided with a data eraser apparatus for erasing data from the IT asset and stored in a memory of the data eraser apparatus and the data eraser apparatus is at least one of separate from the IT asset and independent of the IT asset.

2. The method according to claim 1, wherein the erasure application is at least one of provided with the IT asset and stored in a memory of the IT asset.

3. The method according to claim 2, wherein the erasure application is configured to run on a dedicated operating system of the IT asset, and the erasure application is independent of an operating system of the IT asset.

4. The method according to claim 1, wherein:
the erasure client comprises an erasure agent which is at least one of provided with the IT asset and stored in a memory of the IT asset; and
the erasure agent is configured to run on an operating system of the IT asset.

5. The method according to claim 4, wherein the erasure agent is configured to work in combination with the erasure application.

6. The method according to claim 1, further comprising performing the erasure procedure using software installed at the IT asset or installed at a data eraser configured for communication with the IT asset.

7. The method according to claim 6, wherein the software comprises a dedicated operating system which is independent of an existing operating system of the IT asset and an erasure application running on the dedicated operating system.

8. The method according to claim 6, wherein the software defines a generic erasure procedure and the instructions transmitted from the server modify or supplement the generic erasure procedure so as to tailor the generic erasure procedure according to the profile.

9. The method according to claim 6, comprising executing the software to cause the IT asset to be interrogated to determine the profile or at least one feature of the profile.

10. The method according to claim 1, further comprising performing the erasure procedure using an erasure agent installed on an existing operating system of the IT asset and an erasure application.

11. The method according to claim 1, further comprising performing the erasure procedure using an erasure agent installed on an existing operating system of the IT asset and an erasure application running on a dedicated operating system, wherein the performing the erasure procedure comprises the erasure agent determining that the dedicated operating system should be booted into in preference to the existing operating system of the IT asset so as to initiate the erasure procedure, and wherein:
a software comprises the dedicated operating system which is independent of the existing operating system of the IT asset and the erasure application running on the dedicated operating system, or
the software defines a generic erasure procedure and the instructions transmitted from the server modify or supplement the generic erasure procedure so as to tailor the generic erasure procedure according to the profile.

12. A system for use in at least one of repurposing, erasing data from, and disposing of an IT asset, the system comprising:

a server located remotely from the IT asset; and
an erasure client located remotely from the server, the erasure client including an erasure application, and wherein the server is configured to:
  receive, via a working network connection, an erasure target signal from the IT asset identifying the IT asset as a target for performance of an erasure procedure;
  receive, via the working network connection, at least part of a profile of the IT asset, wherein the profile comprises at least one of:
    a hardware profile comprising data representative of at least one of a type of storage device, an operating system, a type of operating system, a file system, a type of file system, a size of the storage device, a security of the storage device, a presence of encryption, an absence of encryption, whether the storage device is secure, and whether the storage device comprises encrypting storage;
    data indicating a geographical location of the IT asset;
    data indicating an identity of at least one of an owner of the IT asset, an operator of the IT asset, and a user of the IT asset; and
    data indicating a preference with respect to data erasure specified by at least one of the owner of the IT asset, the operator of the IT asset, and the user of the IT asset;
  in response to receipt of the erasure target signal from the IT asset, automatically identify an action to be performed in relation to the IT asset based at least in part on the profile of the IT asset, the action specifying an instruction to start erasing the IT asset according to a specific erasure specification; and
  transmit instructions to the erasure client, via the working network connection, wherein the instructions at least partially define the action to be performed in relation to the IT asset,
  wherein the erasure client is configured so that, in response to receipt of the instructions from the server, the erasure client performs the action in relation to the IT asset,
  wherein the erasure application is at least one of provided with a data eraser apparatus for erasing data from the IT asset and stored in a memory of the data eraser apparatus, and
  wherein the data eraser apparatus is at least one of separate from the IT asset and independent of the IT asset.

13. A server for use in at least one of repurposing, erasing data from, and disposing of an IT asset, the server being configured to be located remotely from the IT asset and to:
  receive, via a working network connection, an erasure target signal, from the IT asset;
  receive at least part of a profile of the IT asset, via the working network connection, wherein the profile comprises at least one of:
    a hardware profile comprising data representative of at least one of type of storage device, an operating system, a type of operating system, a file system, a type of file system, a size of the storage device, a security of the storage device, a presence of encryption, an absence of encryption, whether the storage device is secure, and whether the storage device comprises encrypting storage;
    data indicating a geographical location of the IT asset;
    data indicating an identity of at least one of an owner of the IT asset, an operator of the IT asset, and a user of the IT asset; and
    data indicating a preference with respect to data erasure specified by at least one of the owner of the IT asset, the operator of the IT asset, and the user of the IT asset;
  in response to receipt of the erasure target signal, automatically identify an action to be performed in relation to the IT asset based at least in part on the profile of the IT asset, the action specifying an instruction to start erasing the IT asset according to a specific erasure specification; and
  transmit instructions to an erasure client including an erasure application, via the working network connection, wherein the instructions at least partially define the action to be performed in relation to the IT asset,
  wherein, the erasure client, in response to receipt of the instructions, performs the action in relation to the IT asset,
  wherein the erasure application is at least one of provided with a data eraser apparatus for erasing data from the IT asset and stored in a memory of the data eraser apparatus, and
  wherein the data eraser apparatus is at least one of separate from the IT asset and independent of the IT asset.

14. A non-transitory computer-readable memory comprising an erasure client, which, when executed by a computer, is configured to cause the computer to:
  interrogate an IT asset, via a working network connection, to determine at least one feature of a profile of the IT asset; and
  at least one of:
    transmit the at least one feature of the profile to a remote server, and
    automatically configure an erasure procedure in dependence on the determined at least one feature of the profile, including an instruction to start erasing the IT asset according to a specific erasure specification;
  wherein the erasure client comprises an erasure application, the erasure application is at least one of provided with a memory of a data eraser apparatus and stored in the memory of the data eraser apparatus for erasing data from the IT asset, and wherein the data eraser apparatus is at least one of separate from the IT asset and independent of the IT asset.

15. The non-transitory computer-readable memory according to claim 14, wherein the erasure client comprises an erasure agent which is at least one of provided with a memory of the IT asset and stored in the memory of the IT asset, and wherein the erasure client is configured to run on an operating system of the IT asset.

16. The non-transitory computer-readable memory according to claim 15, wherein the erasure agent is configured to work in combination with the erasure application.

17. A non-transitory computer-readable memory comprising an erasure agent for installation at an IT asset, which, when executed by a computer is configured to cause the computer to:
  interrogate, via a working network connection, the IT asset to determine at least one feature of a profile of the IT asset; and
  at least one of:
    transmit the at least one feature of the profile to a remote server, and automatically configure an erasure procedure in dependence on the determined at least one feature of the profile, including an instruction to start erasing the IT asset according to a specific erasure specification;

wherein the erasure agent includes an erasure application provided with a data eraser apparatus for erasing data from the IT asset and stored in a memory of the data eraser apparatus, and wherein the data eraser apparatus is at least one of separate from the IT asset and independent of the IT asset.

\* \* \* \* \*